United States Patent
Miura

(10) Patent No.: US 10,055,180 B2
(45) Date of Patent: Aug. 21, 2018

(54) PRINTER SETTING STATE UPDATING SYSTEM

(71) Applicant: STAR MICRONICS CO., LTD., Shizuoka-shi (JP)

(72) Inventor: Koji Miura, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/648,586

(22) Filed: Jul. 13, 2017

(65) Prior Publication Data

US 2017/0322752 A1 Nov. 9, 2017

Related U.S. Application Data

(63) Continuation of application No. PCT/JP2016/055779, filed on Feb. 26, 2016.

(30) Foreign Application Priority Data

Jul. 17, 2015 (JP) .................................. 2015-142662

(51) Int. Cl.
*G06F 3/12* (2006.01)
*B41J 29/38* (2006.01)
(Continued)

(52) U.S. Cl.
CPC .............. *G06F 3/123* (2013.01); *B41J 29/38* (2013.01); *G06F 3/1203* (2013.01);
(Continued)

(58) Field of Classification Search
CPC ...... G06F 3/1225; G06F 3/1258; G06F 3/127; G06F 3/123
See application file for complete search history.

(56) References Cited

U.S. PATENT DOCUMENTS 7,996,831 B2 * 8/2011 Mizutani ............ G03G 15/5066
717/171
8,504,612 B2 * 8/2013 Kawai .................... G06F 3/122
709/203
(Continued)

FOREIGN PATENT DOCUMENTS

JP 2010-218352 9/2010
JP 2014-021717 2/2014
(Continued)

*Primary Examiner* — Ted Barnes
(74) *Attorney, Agent, or Firm* — Lex IP Meister, PLLC

(57) ABSTRACT

The invention facilitates a setting state updating operation of the printer. An updating system of a setting state of a printer comprises an application activating unit which issues an application binding command upon detection of a predetermined operation when an application is executed by a mobile. The application binding command designates a printing application and a predetermined setting state updating command. The updating system further comprises a setting state updating unit which executes an updating of the setting state of the printer in the printing application activated by the application activating unit according to the predetermined setting state updating command included in the application binding command. A predetermined operation in the application triggers activation of the printing application for an automatic updating of the printer setting state.

9 Claims, 3 Drawing Sheets

(51) Int. Cl.
*H04N 1/00* (2006.01)
*G06F 8/65* (2018.01)

(52) U.S. Cl.
CPC .............. *G06F 3/1284* (2013.01); *G06F 8/65* (2013.01); *H04N 1/0097* (2013.01); *H04N 2201/0082* (2013.01)

(56) References Cited

U.S. PATENT DOCUMENTS

| | | | |
|---|---|---|---|
| 9,141,321 B1* | 9/2015 | Poppenga | G06F 3/1258 |
| 9,830,141 B2* | 11/2017 | Cairns | G06F 8/65 |
| 2003/0048473 A1* | 3/2003 | Rosen | B41J 29/393 |
| | | | 358/1.15 |
| 2003/0051084 A1* | 3/2003 | Rosen | B41J 29/393 |
| | | | 710/72 |
| 2003/0131072 A1* | 7/2003 | Kobayashi | G06F 3/1204 |
| | | | 709/218 |
| 2003/0137691 A1* | 7/2003 | Tanaka | G06F 3/1204 |
| | | | 358/1.15 |
| 2005/0108358 A1* | 5/2005 | Jarvis | G06F 3/1203 |
| | | | 709/217 |
| 2005/0158100 A1* | 7/2005 | Yamaguchi | G06F 8/65 |
| | | | 400/62 |
| 2007/0038718 A1* | 2/2007 | Khoo | G06Q 10/107 |
| | | | 709/206 |
| 2007/0130572 A1* | 6/2007 | Gilbert | G06F 9/4488 |
| | | | 719/318 |
| 2007/0159650 A1* | 7/2007 | Takamatsu | G06F 8/65 |
| | | | 358/1.15 |
| 2008/0037062 A1* | 2/2008 | Omino | G06F 21/305 |
| | | | 358/1.15 |
| 2009/0257080 A1* | 10/2009 | Herrmann | G06F 9/4411 |
| | | | 358/1.15 |
| 2010/0005460 A1* | 1/2010 | Aiba | G06F 9/4411 |
| | | | 717/173 |
| 2011/0078683 A1* | 3/2011 | Yamamoto | G06F 9/4443 |
| | | | 718/100 |
| 2012/0110213 A1* | 5/2012 | Abe | G06F 3/1204 |
| | | | 710/10 |
| 2012/0271917 A1* | 10/2012 | Matsumoto | G06Q 20/202 |
| | | | 709/217 |
| 2013/0235422 A1* | 9/2013 | Nakata | G06F 3/1205 |
| | | | 358/1.15 |
| 2013/0258406 A1* | 10/2013 | Sarin | G06K 15/002 |
| | | | 358/1.15 |
| 2013/0286429 A1* | 10/2013 | Goyal | G06F 3/123 |
| | | | 358/1.15 |
| 2014/0025779 A1* | 1/2014 | Matsumoto | G06Q 20/202 |
| | | | 709/217 |
| 2014/0177006 A1* | 6/2014 | Sirigiri | G06F 3/1208 |
| | | | 358/3.28 |
| 2014/0375865 A1* | 12/2014 | Shroff | G06T 5/00 |
| | | | 348/333.12 |
| 2014/0376035 A1* | 12/2014 | Niimura | G06F 3/1203 |
| | | | 358/1.15 |
| 2015/0002884 A1* | 1/2015 | Okumura | G06F 3/1203 |
| | | | 358/1.14 |
| 2015/0029540 A1* | 1/2015 | Jo | G06F 3/1209 |
| | | | 358/1.15 |
| 2015/0036170 A1* | 2/2015 | Miyake | G06F 3/1238 |
| | | | 358/1.14 |
| 2015/0036182 A1* | 2/2015 | Nakamura | G06F 3/1207 |
| | | | 358/1.15 |
| 2015/0092233 A1* | 4/2015 | Park | G06F 3/1288 |
| | | | 358/1.15 |
| 2015/0099502 A1* | 4/2015 | Park | H04W 4/16 |
| | | | 455/418 |
| 2015/0156354 A1* | 6/2015 | Yamamoto | G06F 9/4443 |
| | | | 358/1.15 |
| 2015/0205559 A1* | 7/2015 | Miyata | G06F 3/1207 |
| | | | 358/1.15 |
| 2015/0242722 A1* | 8/2015 | Watanabe | G06F 3/1205 |
| | | | 358/1.15 |
| 2015/0279310 A1* | 10/2015 | Itakura | G06F 17/30899 |
| | | | 345/520 |
| 2015/0358487 A1* | 12/2015 | Sugiyama | H04N 1/00973 |
| | | | 358/1.15 |
| 2016/0042545 A1* | 2/2016 | Hiraki | G06F 3/14 |
| | | | 345/619 |
| 2016/0065758 A1* | 3/2016 | Kang | H04N 1/00503 |
| | | | 358/1.15 |
| 2016/0110138 A1* | 4/2016 | Miyata | G06F 3/1207 |
| | | | 358/1.15 |
| 2016/0139865 A1* | 5/2016 | Takamoto | G06K 15/1836 |
| | | | 358/1.15 |
| 2016/0154616 A1* | 6/2016 | Hirata | G06F 3/1222 |
| | | | 358/1.14 |
| 2016/0182762 A1* | 6/2016 | Eum | H04N 1/4413 |
| | | | 358/1.14 |
| 2016/0274851 A1* | 9/2016 | Minegishi | G06F 3/1225 |
| 2016/0316100 A1* | 10/2016 | Hwang | G06F 3/1222 |
| 2016/0338120 A1* | 11/2016 | Boyle | H04L 65/1069 |
| 2016/0378408 A1* | 12/2016 | Asano | G06F 3/1205 |
| | | | 358/1.15 |
| 2016/0378410 A1* | 12/2016 | Inoue | G06F 3/1236 |
| | | | 358/1.15 |
| 2017/0017448 A1* | 1/2017 | Hirata | G06F 3/1229 |
| 2017/0097799 A1* | 4/2017 | Okumura | G06F 3/1203 |
| 2018/0032297 A1* | 2/2018 | She | H04L 67/02 |

FOREIGN PATENT DOCUMENTS

| | | |
|---|---|---|
| JP | 2014-178983 | 9/2014 |
| JP | 2014-215927 | 11/2014 |
| WO | 2006/001157 | 1/2006 |

* cited by examiner

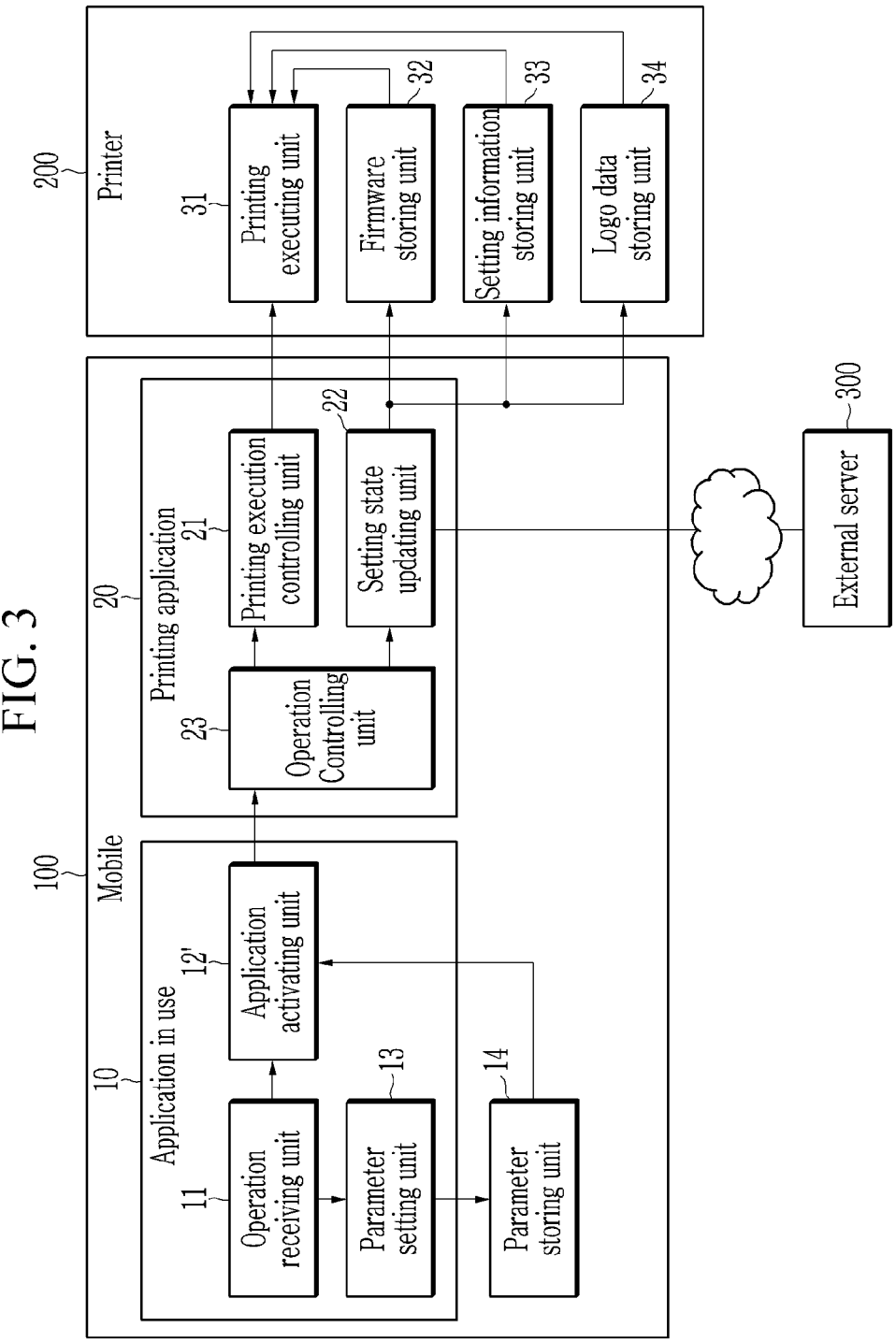

PRINTER SETTING STATE UPDATING SYSTEM

CROSS-REFERENCE TO RELATED APPLICATION

This application is a continuation of International Patent Application No. PCT/JP2016/055779, filed on Feb. 26, 2016, which claimed priority of Japanese Patent Application No. 2015-142662 filed on Jul. 17, 2015. The contents of these applications are incorporated herein by reference in their entirety.

BACKGROUND

(a) Field

The present invention relates to a setting state updating system of a printer, especially, a desirable system capable of updating a setting state of firmware and various setting information of a printer.

(b) Description of the Related Art

An operation of mechanical part (hardware) of a printer is controlled by firmware. Various setting information such as a type of code page, paper size, printing speed, and printing density is read from the printer to control execution of printing.

An updated version of firmware is released at irregular intervals. A printer has desirably the latest version of firmware installed. Conventionally, a printer user manually updates firmware by operating a computer connected to the printer to visit a website of a printer manufacturer, select a relevant version from a plurality of versions provided for each model, and download the selected one into the printer.

The user also manually updates various setting information of the printer. The user operates the computer to update various setting information stored in the printer according to required configuration of the printer for each printing purpose. The user also operates the computer to update stored data in the printer in a system capable of combining the stored data in the printer with a transmitted printing data from the computer.

Recently, a system is provided in which a mobile such as a smart phone and a tablet is used to issue a print instruction to the printer. The user operates the mobile to update firmware, setting information, and stored data.

The instruction is sent from the mobile to the printer by using an application binding technology allowing a user to bind the functions of different applications. The application binding technology is called a URL scheme in iOS and an Intent in Android.

In Japanese Patent Application Laid-Open Publication No. 2014-215927, when a user intends to do something in an application executed by a mobile, other applications available for the purpose are listed on the display. The user selects a desired one, for example, a printing application for execution of printing from the listed applications.

In Japanese Patent Application Laid-Open Publication No. 2014-21717, an application activating command is issued by using a URL scheme. For example, an application activating button has a setting of a URL scheme ("ABC://") designating an application name ("ABC") corresponding to an advertisement of the application. Clicking the button activates the application "ABC" installed in the smart phone. Further, when the URL scheme contains a parameter to be handed to the application, clicking the button allows the parameter to be handed to the application "ABC".

In Japanese Patent Application Laid-Open Publication No. 2014-178983, an operation to be executed can be designated by using a URL scheme having a format of "a description of URL, a description of HTML?a description of operation". For example, a description of "assist://ABCDEF?Wi-Fi=ON" is embedded in a webpage providing a manual of the mobile where "ABCDEF" is a name of an application and "Wi-Fi=ON" is an instruction to set Wi-Fi on. The mobile reads an application corresponding to "ABCDEF" described before "?" and then generates an operation order corresponding to "Wi-Fi=ON" described after "?".

SUMMARY

As described above, a mobile is manually operated to update a printer setting state (an updating of firmware, an updating of setting information, and an updating of stored data), which is a troublesome piece of work for the user. Further, an updating of firmware likely fails since the user is not accustomed to the operation.

The present invention facilitates a setting state updating operation of the printer.

In the invention, upon detection of a predetermined operation when an application is executed by a mobile, an application binding command is issued, designating another application different from the application in use and a predetermined setting state updating command. The designated application is thereby activated and the setting state of the printer is updated according to the designated setting state updating command.

According to the invention, a predetermined operation in an application executed by a mobile triggers activation of another application for an automatic updating of a printer setting state. The invention eliminates a troublesome manual operation and facilitates an updating of a printer setting state.

BRIEF DESCRIPTION OF THE DRAWINGS

FIG. 3 is a functional block diagram of a printing system of a second embodiment.

DETAILED DESCRIPTION

First Embodiment

Figure 1:
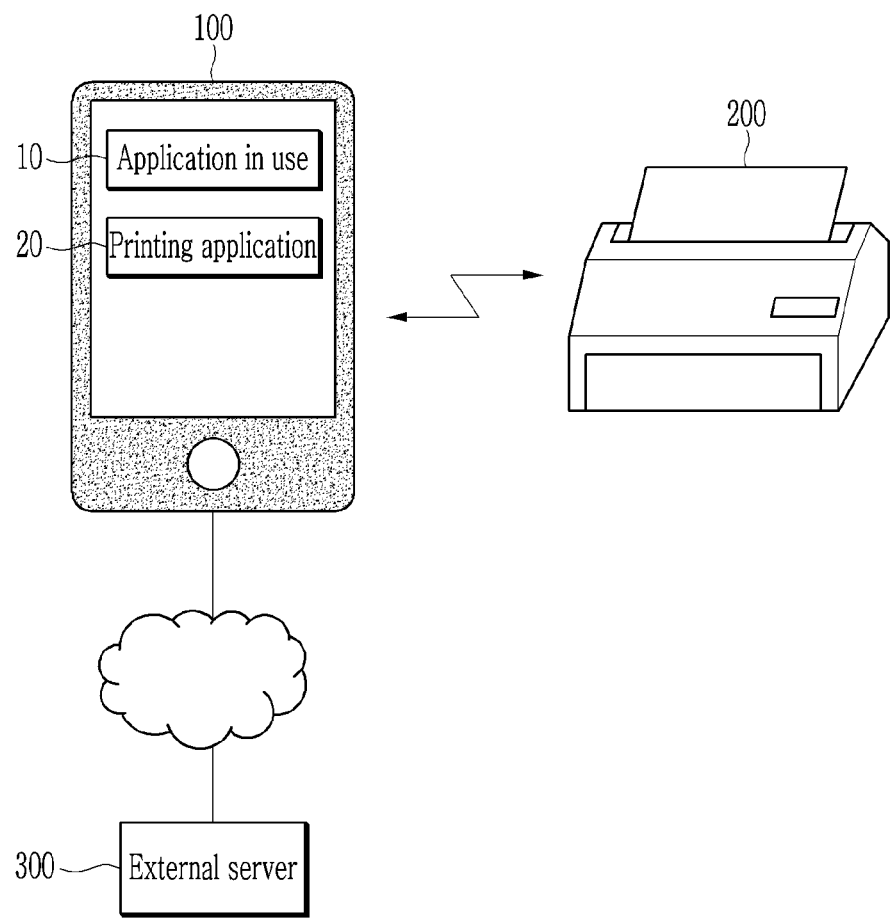
FIG. 1 is an example of a printing system using a setting state updating system of a first embodiment.

A first embodiment of the present invention is being described referring to the drawings. FIG. 1 is an example of a printing system using a setting state updating system of the first embodiment. The print system comprises a mobile 100, a printer 200, and an external server 300.

The mobile 100 may be a smart phone or a tablet. The mobile 100 may be connected to the printer 200 via Wi-Fi or Bluetooth (Registered Trademark) for bi-directional wireless communication. The mobile 100 may be connected to the external server 300 via a communication network such as Internet.

The mobile 100 has an application 10 and a printing application 20 installed. The application 10 is capable of generating and displaying HTML (HyperText Markup Language) data. The printing application 20 is capable of converting the generated HTML data into raster data to be transmitted to the printer 200. The printing application 20 is also capable of controlling an updating of a setting state of the printer 200.

In the embodiment, the HTML data generated by the application 10 is printed by the printer 200. The application 10 corresponds to "a first application" as claimed. The application 10 is called the application in use 10. The printing application 20 is activated when a predetermined operation is detected in the application in use 10. The printing application 20 corresponds to "a second application" as claimed. The application in use 10 may be an iOS application. The printing application 20 may be an iOS application.

When a print instruction is given in the application in use 10, an application binding command may be issued by using a URL scheme. The application binding command designates the printing application 20 and a printing command. The printing application 20 is thereby activated to control execution of printing according to the designated printing command. The printing application 20 converts the HTML data generated by the application in use 10 into the raster data for printing. The printing application 20 transmits the raster data to the printer 200 according to the printing command recognizable by the printer 200. The print instruction from the mobile 100 is thereby executed Further, when an operation instructing an updating of a setting state of the printer 200 (an example of "a predetermined operation") is detected in the application in use 10, an application binding command may be issued by using a URL scheme. The application binding command designates the printing application 20 and a predetermined setting state updating command. The printing application 20 is thereby activated and the setting state of the printer 200 is updated according to the designated updating command.

Figure 2:
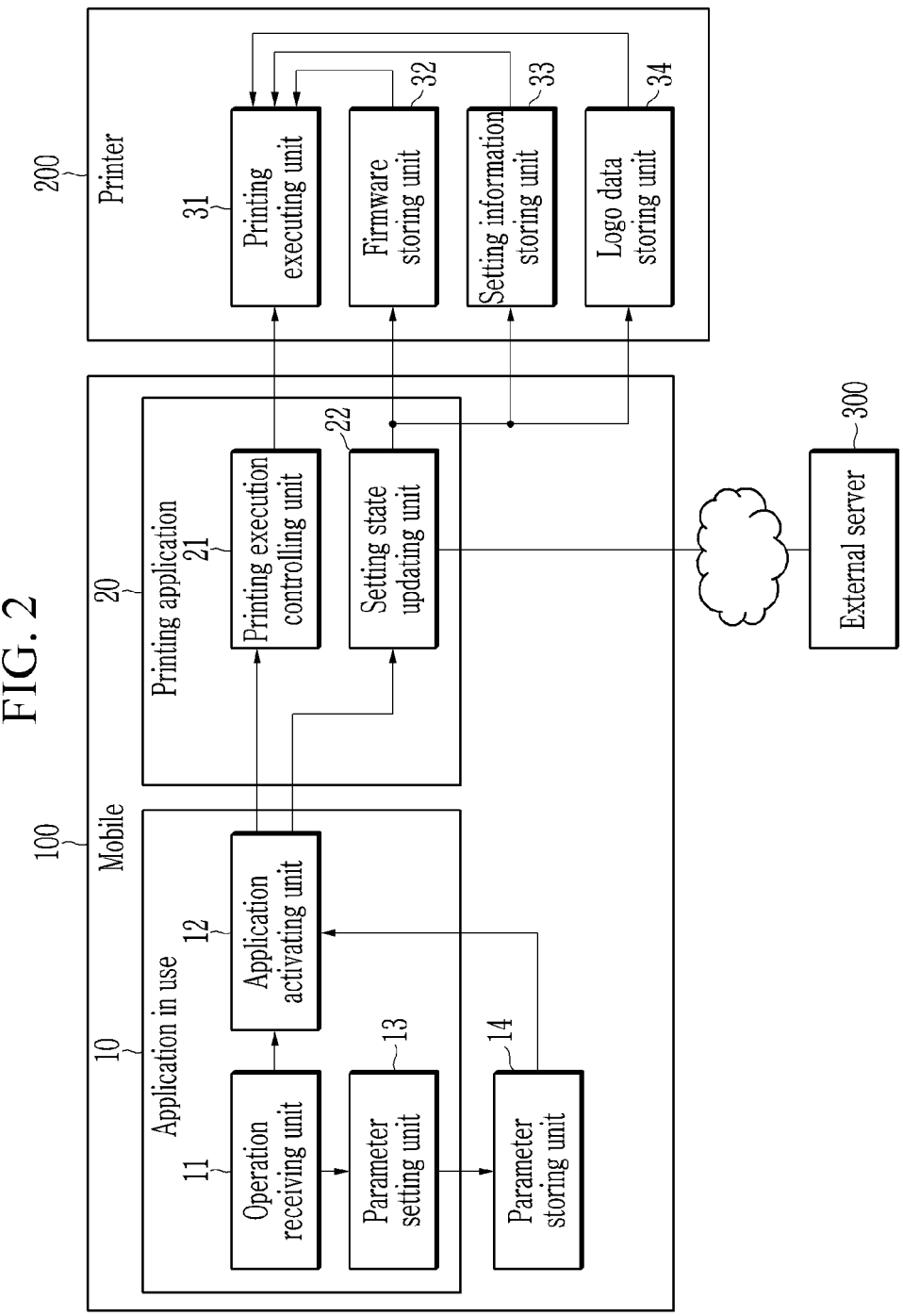
FIG. 2 is a functional block diagram of the printing system of the first embodiment.

FIG. 2 is a functional block diagram of the printing system of the first embodiment. The function of the setting state updating system may be embodied by the application in use 10 and the printing application 20 installed in the mobile 100.

The printing system comprises an operation receiving unit 11, an application activating unit 12, a parameter setting unit 13, a parameter storing unit 14, a printing execution controlling unit 21, a setting state updating unit 22, a printing executing unit 31, a firmware storing unit 32, a setting information storing unit 33, and a logo data storing unit 34.

The operation receiving unit 11, the application activating unit 12, and the parameter setting unit 13 are provided by the application in use 10. The printing execution controlling unit 21 and the setting state updating unit 22 are provided by the printing application 20. The printing executing unit 31 is provided by software of the printer 200.

The function of each of the blocks 11 to 13 may be realized by a CPU which executes a program of the application in use 10 stored in a storage device such as a RAM, a ROM, a hard disc, and a semiconductor memory. The function of each of the blocks 21 and 22 may be realized by a CPU which executes a program of the printing application 20 stored in a storage device such as a RAM, a ROM, a hard disc, and a semiconductor memory. The function of the block 31 may be realized by a CPU which executes a program stored in a storage device such as a RAM, a ROM, a hard disc, and a semiconductor memory. Part of the functional blocks 11 to 13, 21, 22, and 31 may be constitued by hardware or DSP (Digital Signal Processor).

The operation receiving unit 11 receives a user operation instructing execution of printing of the HTML data generated by the application in use 10 ("a printing executing operation") as well as a user operation instructing an updating of a setting state of the printer 200 ("a setting state updating operation"). The printing executing operation may be a user operation clicking a printing button. The setting state updating operation may be a user operation clicking a updating button.

The operation receiving unit 11 also receives a user operation setting a parameter for a setting state updating command ("a parameter setting operation"). The parameter to be set may be a type of the printer 200, a type of code page to be used for printing, paper size, printing speed, printing density, and logo data to be used for printing.

The parameter setting unit 13 stores various parameters set by the parameter setting operation in the parameter storing unit 14. The setting information such as the type of the code page, paper size, printing speed, and printing density is varied according to the purpose of printing (a type of the application in use 10). A parameter may be set for every type of the application in use 10 to be stored in the parameter storing unit 14.

Similarly, a paramater of logo data may be set for every type of the application in use 10 to be stored in the parameter storing unit 14. For example, a file name of logo data may be set as the parameter while actual logo data may be stored in the parameter storing unit 14 or in a not-shown storing unit of the mobile 100.

Further, location of stored logo data may be set as the parameter. For example a URL of the external server 300 may be set as the parameter when logo data is stored in the external server 300. Actual logo data may be included in the setting state updating command when stored as the parameter in the parameter storing unit 14.

The application activating unit 12 issues the application binding command designating the printing application 20 and the printing command (a query character string) when the printing execution operaration is received by the operation receiving unit 11. The application binding command uses a URL scheme since the mobile 100 in this embodiment is iOS-based. The application activating unit 12 activates the printing application 20 by issuing the application binding command in the format of:

[a name of a printing application]://print/?html=<HTML data> where the portion of "[a name of a printing application]://" represents the URL scheme and the portion of "print" represents the printing command When the name of the printing application is "PassPRNT" and the HTML data has a file name of "Receipt data", the application binding command may be in the format of:

PassPRNT://print/?html=<Recept data>

Instead of the file name, the HTML data may be actual data or a URL to which data is downloaded.

The application activating unit 12 also issues the application binding command designating the printing application 20 and a predetermined setting state updating command (a query character string) according to a setting state updating parameter stored in the parameter storing unit 14 when the setting state updating operation is received by the operation receiving unit 11.

When the setting state updating operation relates to an updating of firmware of the printer 200, the application activating unit 12 activates the application 20 by issuing the application binding command in the format of:

PassPRNT://configure/firmware/?model=<printer model>&ver=latest

The portion of "configure/firmware" represents the updating of firmware. The portion of "?model=<printer model>" represents a model of the printer 200, of which information may be stored in the parameter storing unit 14. The portion of "&ver=latest" instructs downloading the latest version of firmware. This eliminates the need of storing the latest version of firmware in the parameter storing unit 14. Any version may be stored as the parameter in the parameter storing unit 14 if desired.

When the setting state updating operation relates to an updating of setting information of the printer 200, the application activating unit 12 activates the application 20 by issuing the application binding command in the format of:
PassPRNT://configure/memory switch/?No.=<memory switch No.>&value=<value of setting information>

The portion of "configure/memory switch" represents the updating of setting information. The portion of "?No.=<memory switch No.>" represents a type of setting information (type of code page, paper size, printing speed, printing density, etc.). The portion of "&value=<value of setting information>" represents a value of the setting information. The memory switch No. and the value of setting information may be stored in the parameter storing unit 14.

When the setting state updating operation relates to an updating of logo data of the printer 200, the application activating unit 12 activates the application 20 by issuing the application binding command in the format of:
PassPRNT://configure/logo/?logo=<logo data>

The portion of "configure/logo" represents the updating of logo data. The portion of "?logo=<logo data>" represents a file name of logo data. The file name may be stored in the parameter storing unit 14. Instead of the file name, the logo data may be designated by actual data or a URL to which data is downloaded (a URL of the external server 300, for example).

The printing execution controlling unit 21 of the printing application 20 activated by the application activating unit 12 controls execution of printing by the printer 200. The printing execution controlling unit 21 converts the HTML data designated by <Receipt data> into the raster data according to the printing command included in the application binding command, and then transmits the raster data to the printer 200 according to the printing command recognizable by the printer 200. The printing executing unit 31 of the printer 200 executes a printing upon receipt of instruction from the printing execution controlling unit 21.

The setting state updating unit 22 updates the setting state of the printer 200 according to the setting state updating command included in the application binding command issued by the applicating activating unit 12.

When the setting state updating command on an updating of firmware is included, the setting state updating unit 22 may download relevant firmware from the external server 300 according to model information designated as the parameter and install the downloaded firmware into the printer 200. The latest firmware is thereby stored in the firmware storing unit 32.

The setting state updating unit 22 may compare the latest version of firmware stored in the external server 300 with the version of firmware stored in the firmware storing unit 32. The version stored in the external server 300 may be downloaded and installed into the printer 200 only when newer than the version stored in the firmware storing unit 32.

When the setting state updating command on an updating of setting information is included, the setting state updating unit 22 may set the printer 200 according to the setting information designated as the parameter and stores the setting information into the printer 200. The setting state updating unit 22 updates the setting information stored in the setting information storing unit 33 according to the setting information designated as the parameter of the command.

When the setting state updating command on an updating of logo data is included, the setting state updating unit 22 may store logo data designated by the parameter in the logo data storing unit 34 of the printer 200. When a file name of logo data is included in the command, the setting state updating unit 22 may acquire logo data corresponding to the file name from the parameter storing unit 14 or another not-shown storing unit and store the acquired logo data in the logo data storing unit 34.

When actual logo data is included in the command, the setting state updating unit 22 may only store the actual logo data into the logo data storing unit 34. When a URL of the external server 300 is included, the setting state updating unit 22 may acquire logo data stored in the external server 300 designated by the URL.

The printing executing unit 31 of the printer 200 controls execution of printing according to the firmware stored in the firmware storing unit 32. The printing executing unit 31 executes a printing according to various setting information stored in the setting information storing unit 33. The printing executing unit 31 executes a printing of image of logo data stored in the logo data storing unit 34, for example, in a predetermined position on paper.

In the first embodiment of the invention, when the setting state updating operation (an operation of clicking the updating button) is detected in the application in use 10 executed by the mobile 100, the application binding command is issued, designating the printing application 20 different from the application in use 10 and a predetermined setting state updating command. The printing application 20 is thereby activated and the printer setting state is updated according to the setting state updating command included in the application binding command.

According to the embodiment, only clicking the updating button in the application in use 10 triggers activation of the printing application 20 for an automatic updating of the printer setting state. The invention eleminates a troublesome manual operation and facilitates an updating of a printer setting state.

The scope of the invention is not limited to the first embodiment where the updating of the setting state of the printer 200 is controlled by the printing application 20 activated by the setting state updating operation by the user. For example, the printing application 20 may be activated by the printing executing operation while another application different from the printing application 20 may be activated by the setting state updating operation. The updating of the setting state of the printer 200 may be controlled by the different application activated by the setting state updating operation.

The scope of the invention is not limited to the first embodiment where the application binding command is issued when the setting state updating operation by the user is detected as an example of a predetermined operation in the application in use 10. For example, accumulated time of activation of the application in use 10 is counted and the application binding command may be issued by batch processing everytime the accumulated count reaches a predetermined time.

Second Embodiment

A second embodiment of the present invention is being described referring to the drawings. The entire configuration of the print system is similar to FIG. 1. FIG. 3 is a functional block diagram of the printing system of the second embodiment. Any component having the same symbol as FIG. 2 has the same function, whose description is being omitted.

The application in use 10 of the second embodiment is provided with an application activating unit 12' instead of the application activating unit 12. The printing application 20 of the second embodiment is further provided with an operation controlling unit 23.

When a print instruction is given in the application in use 10, an application binding command is issued by use of the URL scheme, designating the printing application 20, a printing command, and a predetermined setting state updating command. The printing application 20 is thereby activated, the setting state of the printer 200 is updated according to the setting state updating command, and a printing is executed according to the printing command. Specifically in this embodiment, the updating of the setting state is followed by execution of printing.

The application activating unit 12' of the application in use 10 issues the application binding command designating the printing application 20, the printing command, and the predetermined setting state updating command when an printing execution operation is received by the operation receiving unit 11. The printing application 20 is thereby activated.

The operation controlling unit 23 of the printing application 20 controls the printing executing controlling unit 21 and the setting state updating unit 22 according to the application binding command issued by the application activating unit 12'. Specifically, the updating of the setting state by the setting state updating unit 22 is controlled to be followed by the execution of printing by the printing executing controlling unit 21.

The application binding command issued by the application activating unit 12' may be in the format of:
PassPRNT://printandconfigure/?firmwaremodel=<printer model>&ver=latest&printhtml=<Receipt data>,
describing that the updating of firmware is followed by execution of printing.

The printing executing operation may trigger an updating of firmware, an updating of setting information, or an updating of logo data according to the parameter in the parameter storing unit 14 stored by the parameter setting unit 13. The application activating unit 12' issues the application binding command designating the predetermined setting state updating command (a command for updating at least one of firmware, setting information, and logo data) according to the parameter stored in the parameter storing unit 14.

According to the second embodiment, in response to the printing execution operation, the setting state of the printer 200 is updated as required before execution of printing without the user being aware of the updating. For example, when the application binding command designating an updating of firmware is issued in response to the printing execution operation, firmware is automatically updated to the latest version as the case may be before execution of printing without the user being aware of the updating.

The scope of the invention is not limited to the second embodiment where the updating of the setting state is followed by execution of printing. The updating of the setting state which likely takes time may be preceded by execution of printing. The updating of the setting information or the logo data which likely does not take time is desirably followed by execution of printing but may be preceded by.

The scope of the invention is not limited to the embodiments where the iOS-based URL scheme is used as an example of the application binding command. The Android-based Intent can be used instead.

In the first and second embodiments, the setting state updating command for an updating of firmware designates a printer model as the parameter. The setting state updating unit 22 may compare model information acquired from the printer with model information designated as the parameter to display an error message if different.

The scope of the invention is not limited to the embodiments where a single printer is connected. A plurality of printers may be connected to be simultaneously subject to the updating of firmware, the updating of setting information, and the updating of logo data The scope of the invention is not limited to the embodiments where the HTML data generated by the application 10, 10' is converted into the raster data to be transmitted to the printer 200. Instead, the raster data may be replaced by any data of various formats including a binary format such as a command unique to the printer and an XML format.

The scope of the invention is not limited to the embodiments. The invention may be embodied in various forms without departing from the scope of the invention.

What is claimed is:

1. An updating system of a setting state of a printer comprising:
an application activating unit which activates a printing application by issuing an application binding command upon receiving a print instruction in an application in use in a mobile, the printing application being installed in the mobile to convert a data generated by the application in use to a printing data to be output to the printer,
wherein the application binding command designates the printing application, a predetermined setting state updating command, and a printing command,
wherein the printing application is provided with a setting state updating unit which executes an updating of the setting state of the printer according to the predetermined setting state updating command included in the application binding command, and
wherein the printing application is further provided with a printing execution controlling unit which controls execution of printing by the printer according to the printing command included in the application binding command.

2. The updating system of claim 1, wherein the printing application is further provided with an operation controlling unit which controls the setting state updating unit and the printing execution controlling unit in such a manner that the updating by the setting state updating unit is followed by the execution of printing by the printing execution controlling unit.

3. The updating system of claim 2, wherein the setting state updating unit replaces a stored data in the printer with an updated data designated by the setting state updating command.

4. The updating system of claim 2, wherein the setting state updating unit sets the printer according to a setting information designated by a parameter included in the setting state updating command and stores the setting information in the printer.

5. The updating system of claim 1, wherein the printing application is further provided with an operation controlling unit which controls the setting state updating unit and the printing execution controlling unit in such a manner that the updating by the setting state updating unit is preceded by the execution of printing by the printing execution controlling unit.

6. The updating system of claim 5, wherein the setting state updating unit downloads a piece of firmware from an external server and installs the downloaded firmware into the printer, the piece of firmware being designated by a model information included as a parameter in the setting state updating command.

7. The updating system of claim 1, wherein the setting state updating unit downloads a piece of firmware from an external server and installs the downloaded firmware into the printer, the piece of firmware being designated by a model information included as a parameter in the setting state updating command.

8. The updating system of claim 1, wherein the setting state updating unit sets the printer according to a setting information designated by a parameter included in the setting state updating command and stores the setting information in the printer.

9. The updating system of claim 1, wherein the setting state updating unit replaces a stored data in the printer with an updated data designated by the setting state updating command.

* * * * *